United States Patent
Yerramalli et al.

(10) Patent No.: US 12,432,683 B2
(45) Date of Patent: Sep. 30, 2025

(54) REGIONAL POSITIONING ASSISTANCE DATA

(71) Applicant: QUALCOMM Incorporated, San Diego, CA (US)

(72) Inventors: Srinivas Yerramalli, San Diego, CA (US); Mukesh Kumar, Hyderabad (IN); Alexandros Manolakos, Escondido, CA (US); Sven Fischer, Nuremberg (DE); Marwen Zorgui, San Diego, CA (US); Lorenzo Ferrari, Castro Valley, CA (US); Yih-Hao Lin, San Diego, CA (US); Xiaoxia Zhang, San Diego, CA (US); Rajat Prakash, San Diego, CA (US); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 423 days.

(21) Appl. No.: 18/000,020

(22) PCT Filed: Jul. 7, 2021

(86) PCT No.: PCT/US2021/040738
§ 371 (c)(1),
(2) Date: Nov. 28, 2022

(87) PCT Pub. No.: WO2022/011045
PCT Pub. Date: Jan. 13, 2022

(65) Prior Publication Data
US 2023/0319763 A1    Oct. 5, 2023

(30) Foreign Application Priority Data
Jul. 8, 2020    (IN) .............................. 202041029092

(51) Int. Cl.
*H04W 64/00* (2009.01)
*G01S 5/02* (2010.01)

(52) U.S. Cl.
CPC ........... *H04W 64/00* (2013.01); *G01S 5/0236* (2013.01)

(58) Field of Classification Search
None
See application file for complete search history.

(56) References Cited

U.S. PATENT DOCUMENTS

| 2018/0213350 A1* | 7/2018 | Pon ......................... H04W 4/02 |
| 2020/0053690 A1 | 2/2020 | Fischer et al. |

OTHER PUBLICATIONS

CATT: "Introduce Positioning SI Area ID", 3GPP Draft, 3GPP TSG-RAN WG3 #107bis-e, R3-201958, 3rd Generation Partnership Project (3GPP), Mobile Competence Centre, 650, Route Des Lucioles, F-06921 Sophia-Antipolis Cedex, France, vol. RAN WG3, No. Online, Apr. 20, 2020-Apr. 30, 2020, Apr. 10, 2020, (Apr. 10, 2020), XP051873996, 2 Pages, Page 1.

(Continued)

*Primary Examiner* — Suhail Khan
(74) *Attorney, Agent, or Firm* — SUNSTEIN LLP

(57) ABSTRACT

A signal measuring method includes: receiving, at a user equipment, first positioning assistance data having a first area of applicability and a first positioning assistance data profile; storing the first positioning assistance data at the user equipment; determining, at the user equipment, that second positioning assistance data correspond to the first positioning assistance data based on the first area of applicability including a second area of applicability, of the second positioning assistance data, and based on a second positioning assistance data profile of the second positioning assistance data corresponding to the first positioning assistance data profile; and measuring, at the user equipment, a positioning signal corresponding to the second area of (Continued)

applicability using the first positioning assistance data in response to determining that the second positioning assistance data correspond to the first positioning assistance data.

20 Claims, 11 Drawing Sheets

(56) References Cited

OTHER PUBLICATIONS

CATT: "Report of [Post109bis-e][950][POS] Remaining Issues on Broadcast", 3GPP Draft, 3GPP TSG-RAN WG2 Meeting #110-e, R2-2006012, 3rd Generation Partnership Project (3GPP), Mobile Competence Centre, 650, Route Des Lucioles, F-06921 Sophia-Antipolis Cedex, France, vol. RAN WG2, No. Electronic Meeting, Jun. 1, 2020-Jun. 12, 2020, May 30, 2020 (May 30, 2020), XP051892273, 12 Pages, Sections 2.1.2-2.1.3, pp. 2-4.

Ericsson: "Text Proposal for on Demand System Information Procedure", 3GPP Draft, 3GPP TSG-RAN WG2 #110, R2-2004638, 3rd Generation Partnership Project (3GPP), Mobile Competence Centre, 650, Route Des Lucioles, F-06921 Sophia-Antipolis Cedex, France, vol. RAN WG2, No. Electronic Meeting, Jun. 1, 2020-Jun. 12, 2020, May 22, 2020 (May 22, 2020), XP051888281, 5 Pages, pp. 3-5.

Huawei: "(TP to BL CR for TS 38.455) NR Assistance Data Delivery", 3GPP Draft, 3GPP TSG-RAN3 Meeting #107-bis-e, R3-202055, 3rd Generation Partnership Project (3GPP), Mobile Competence Centre, 650, Route Des Lucioles, F-06921 Sophia-Antipolis Cedex, France, vol. RAN WG3, No. Online Meeting, Apr. 20, 2020-Apr. 30, 2020, Apr. 9, 2020 (Apr. 9, 2020), XP051870580, 2 Pages, Section 1-3, pp. 1-2.

International Search Report and Written Opinion—PCT/US2021/040738—ISA/EPO—Oct. 27, 2021.

* cited by examiner

700

| Positioning assistance data message group | Positioning assistance data type | Positioning assistance data message(s) | areaScope | Frequency layer | Expiration |
|---|---|---|---|---|---|
| Group 1 | RAT-RTT | posSIB-A1 posSIB-B1 posSIB-C1 | Cell 1 | | DHM1 |
| Group 2 | RAT-RTT | posSIB-A2 posSIB-B2 posSIB-C2 | Cells 2, 3 | | DHM2 |
| Group 3 | RAT-OTDOA | posSIB-D1 posSIB-E1 | Cells 1, 2 | FL1 | DHM3 |
| Group 4 | RAT-OTDOA | posSIB-D2 posSIB-E2 | Cell 3 | FL2 | DHM4 |
| Group 5 | | | Cells 1, 2, 3 | FL3 | DHM5 |
| Group 6 | SPS | posSIB-F1 | Cells 1, 2, 3 | | DHM6 |
| Group 7 | SPS | posSIB-F2 | Cells 4, 5 | | DHM7 |
| Group 8 | RAT-RTT | posSIB-A3 posSIB-B3 posSIB-C3 | Cells 4, 5 | | DHM8 |
| Group 9 | RAT-OTDOA | posSIB-D3 posSIB-E3 | Cells 4, 5 | | DHM9 |

FIG. 7

REGIONAL POSITIONING ASSISTANCE DATA

CROSS-REFERENCE TO RELATED APPLICATIONS

This application is the National Stage of International Application No. PCT/US2021/040738, filed Jul. 7, 2021, entitled "REGIONAL POSITIONING ASSISTANCE DATA," which claims the benefit of Indian Patent Application number 202041029092, filed Jul. 8, 2020, entitled "REGIONAL POSITIONING ASSISTANCE DATA," both of which are assigned to the assignee hereof, and the entire contents of both of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example user equipment includes: a transceiver; a memory; and a processor, communicatively coupled to the transceiver and the memory, and configured to: receive, via the transceiver, first positioning assistance data having a first area of applicability and a first positioning assistance data profile; store the first positioning assistance data in the memory; determine that second positioning assistance data correspond to the first positioning assistance data based on the first area of applicability including a second area of applicability, of the second positioning assistance data, and based on a second positioning assistance data profile of the second positioning assistance data corresponding to the first positioning assistance data profile; and measure a positioning signal corresponding to the second area of applicability using the first positioning assistance data in response to determining that the second positioning assistance data correspond to the first positioning assistance data.

Another example user equipment includes: means for receiving first positioning assistance data having a first area of applicability and a first positioning assistance data profile; memory means for storing the first positioning assistance data; means for determining that second positioning assistance data correspond to the first positioning assistance data based on the first area of applicability including a second area of applicability, of the second positioning assistance data, and based on a second positioning assistance data profile of the second positioning assistance data corresponding to the first positioning assistance data profile; and means for measuring a positioning signal corresponding to the second area of applicability using the first positioning assistance data in response to determining that the second positioning assistance data correspond to the first positioning assistance data.

An example signal measuring method includes: receiving, at a user equipment, first positioning assistance data having a first area of applicability and a first positioning assistance data profile; storing the first positioning assistance data at the user equipment; determining, at the user equipment, that second positioning assistance data correspond to the first positioning assistance data based on the first area of applicability including a second area of applicability, of the second positioning assistance data, and based on a second positioning assistance data profile of the second positioning assistance data corresponding to the first positioning assistance data profile; and measuring, at the user equipment, a positioning signal corresponding to the second area of applicability using the first positioning assistance data in response to determining that the second positioning assistance data correspond to the first positioning assistance data.

An example non-transitory, processor-readable storage medium includes processor-readable instructions configured to cause a processor of a user equipment to: receive first positioning assistance data having a first area of applicability and a first positioning assistance data profile; store the first positioning assistance data; determine that second positioning assistance data correspond to the first positioning assistance data based on the first area of applicability including a second area of applicability, of the second positioning assistance data, and based on a second positioning assistance data profile of the second positioning assistance data corresponding to the first positioning assistance data profile; and measure a positioning signal from a second cell using the first positioning assistance data in response to determining that the second positioning assistance data correspond to the first positioning assistance data.

An example location server includes: a transceiver; a memory; and a processor, communicatively coupled to the transceiver and the memory, and configured to: associate a first area of applicability with a plurality of first positioning assistance messages each including respective first positioning assistance data; associate a second area of applicability with a second positioning assistance message that is distinct from the plurality of first positioning assistance messages and that includes second positioning assistance data; and transmit configuration information via the transceiver indicating that the first area of applicability is associated with the plurality of first positioning assistance messages and that the second area of applicability is associated with the second positioning assistance message.

Another example location server includes: means for associating a first area of applicability with a plurality of first positioning assistance messages each including respective first positioning assistance data; means for associating a second area of applicability with a second positioning assistance message that is distinct from the plurality of first positioning assistance messages and that includes second positioning assistance data; and means for transmitting configuration information to a user equipment indicating that the first area of applicability is associated with the plurality of first positioning assistance messages and that the second area of applicability is associated with the second positioning assistance message.

An example configuration method includes: associating a first area of applicability with a plurality of first positioning assistance messages each including respective first positioning assistance data; associating a second area of applicability with a second positioning assistance message that is distinct from the plurality of first positioning assistance messages and that includes second positioning assistance data; and transmitting configuration information to a user equipment indicating that the first area of applicability is associated with the plurality of first positioning assistance messages and that the second area of applicability is associated with the second positioning assistance message.

Another example non-transitory, processor-readable storage medium includes processor-readable instructions configured to cause a processor of a location server to: associate a first area of applicability with a plurality of first positioning assistance messages each including respective first positioning assistance data; associate a second area of applicability with a second positioning assistance message that is distinct from the plurality of first positioning assistance messages and that includes second positioning assistance data; and transmit configuration information to a user equipment indicating that the first area of applicability is associated with the plurality of first positioning assistance messages and that the second area of applicability is associated with the second positioning assistance message.

BRIEF DESCRIPTION OF THE DRAWINGS

FIG. 7 is a table indicating positioning assistance data groups.

DETAILED DESCRIPTION

Figure 1:
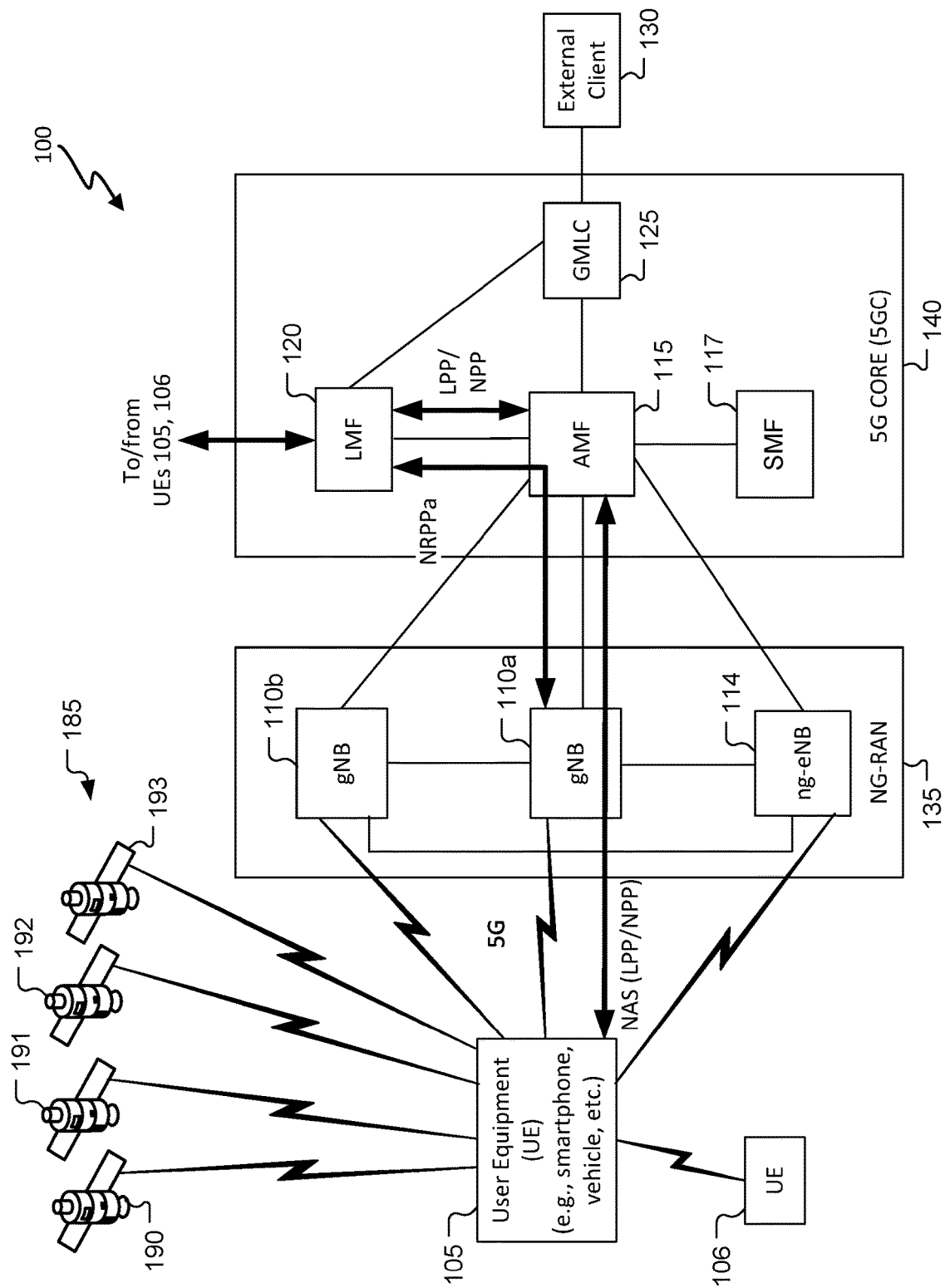
FIG. 1 is a simplified diagram of an example wireless communications system.

Techniques are discussed herein for providing and using the same positioning assistance data in multiple regions. For example, a server may determine and have sent to a user equipment (UE), and the UE may obtain, positioning assistance data and an indication of multiple regions (e.g., cells) in which the positioning assistance data may be used. The positioning assistance data may be provided to the UE in positioning assistance data messages and the server may provide indications to the UE as to which positioning assistance data messages may be used for which regions, e.g., which data messages within the respective regions will have the same positioning assistance data in each of the regions. Groups of the positioning assistance data messages may be specified in terms of one or more positioning assistance data characteristics (e.g., message type, message name, frequency layer). These are examples, and other examples (of UEs and/or criteria) may be implemented.

Items and/or techniques described herein may provide one or more of the following capabilities, as well as other capabilities not mentioned. Processing power may be reduced for measuring positioning reference signals. Accuracy of determination of a position of a UE may be improved. Positioning latency may be decreased. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110*a*, 110*b* and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110*a*, 110*b* and/or the ng-eNB 114 may be configured to communicate with the UE 105 via multiple carriers. Each of the gNBs 110*a*, 110*b* and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
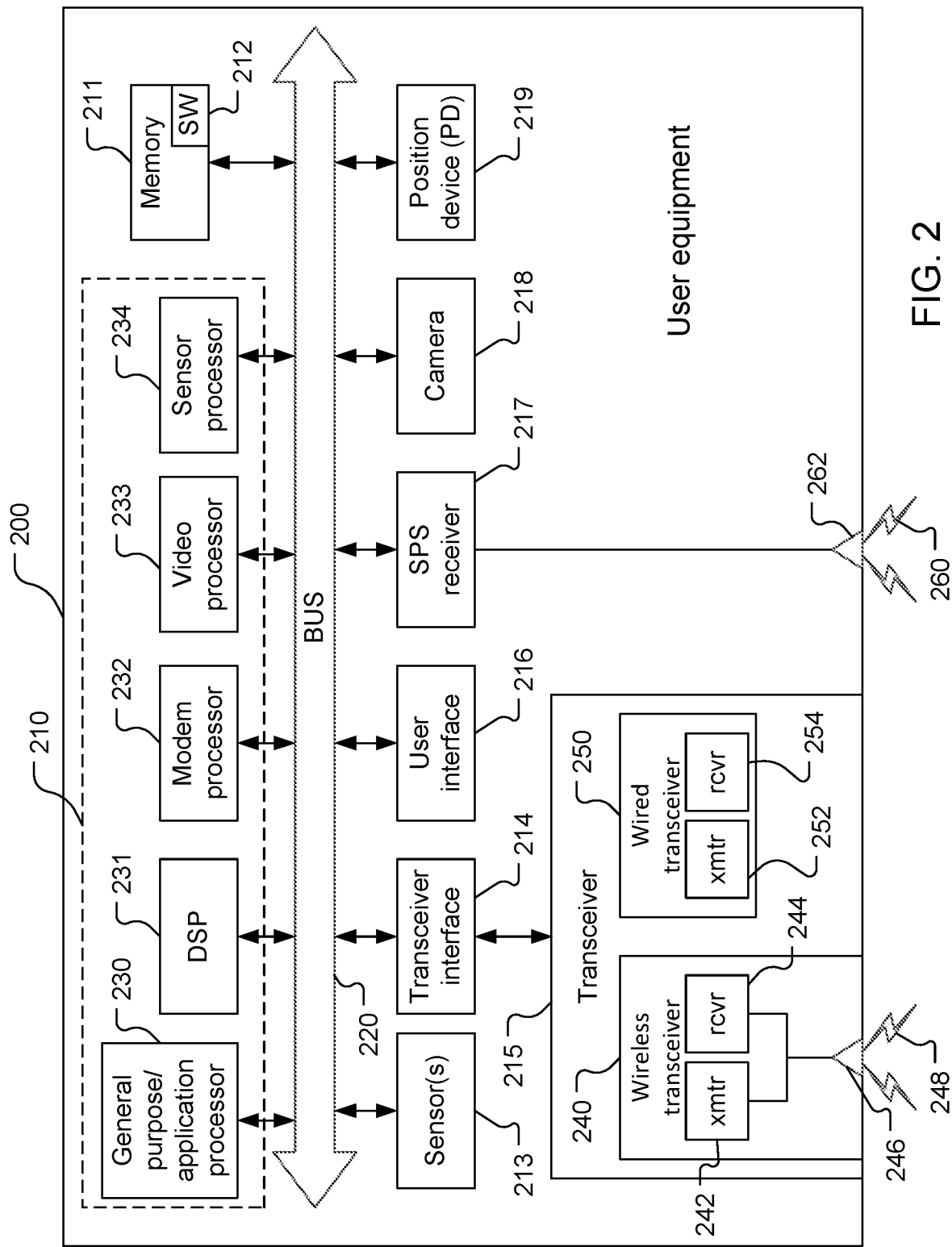
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the network 135 to send communications to, and receive communications from, the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
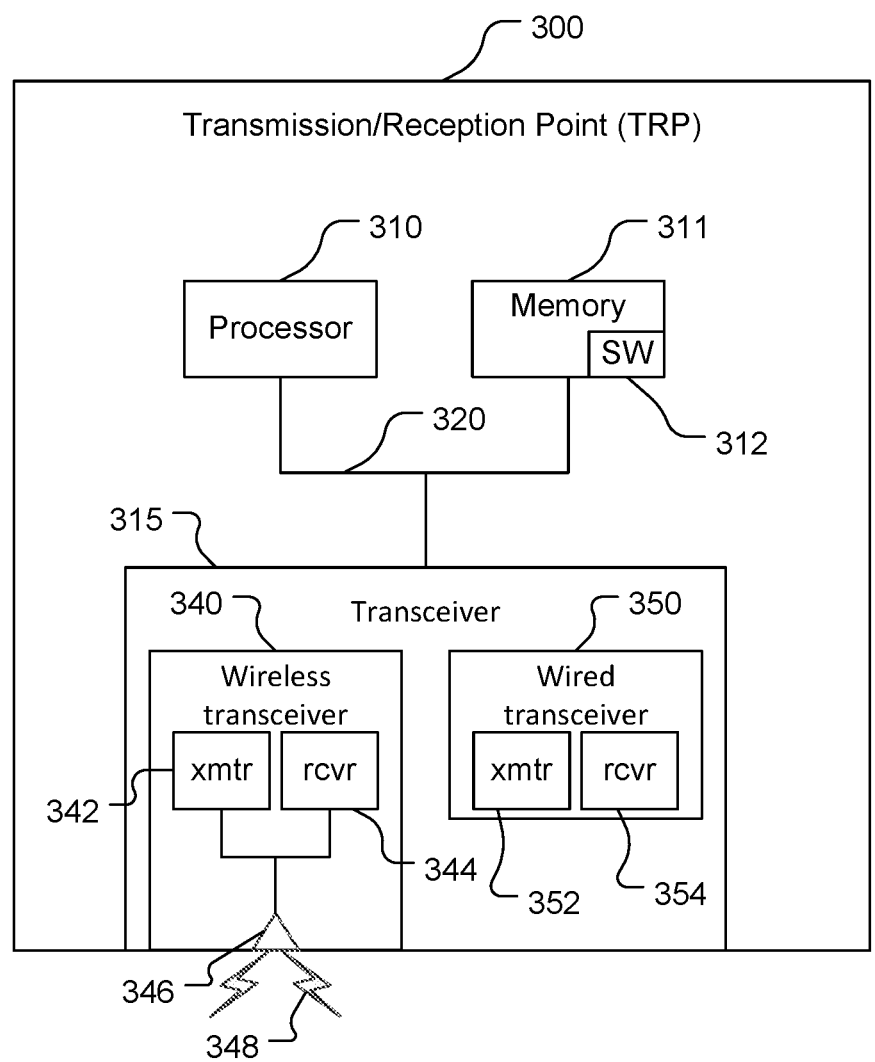
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
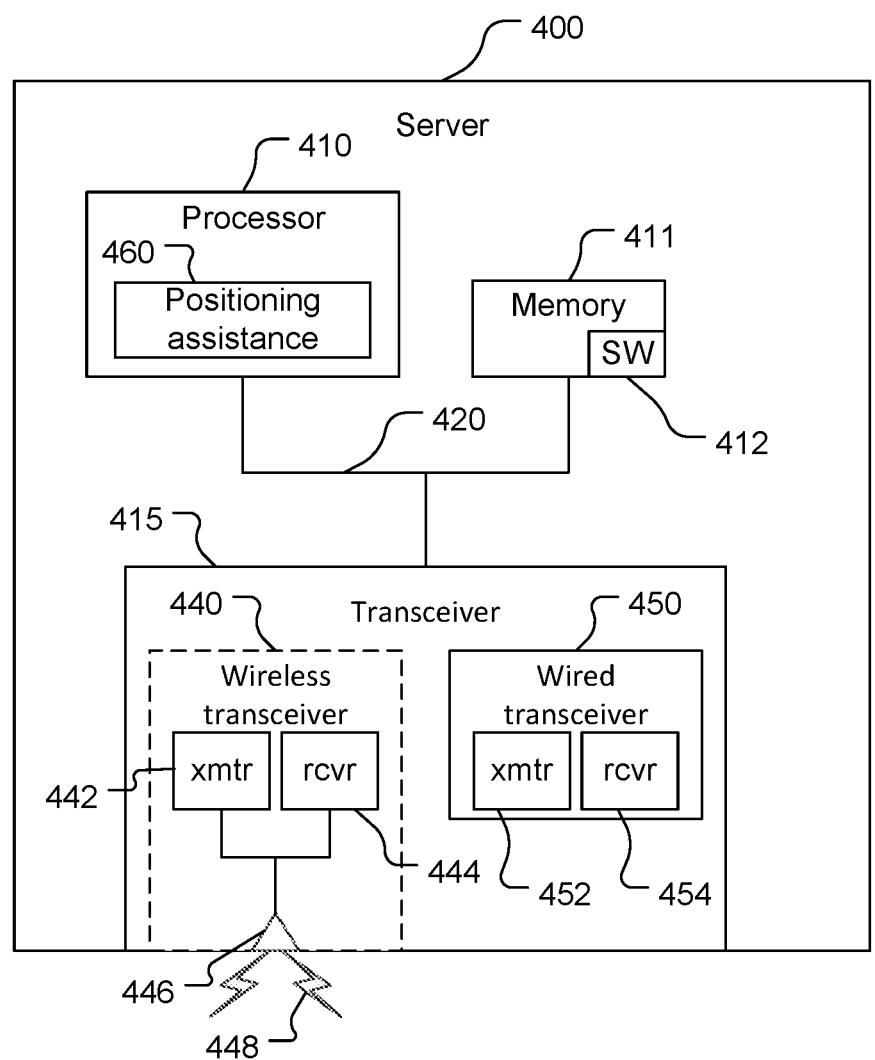
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \rightarrow Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \rightarrow Rx}$ between the transmission time of the RTT measurement signal from the base station and the ToA of the RTT response at the base station to the UE-reported time difference $T_{Rx \rightarrow Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Common Positioning Assistance Data Areas

Figure 5:
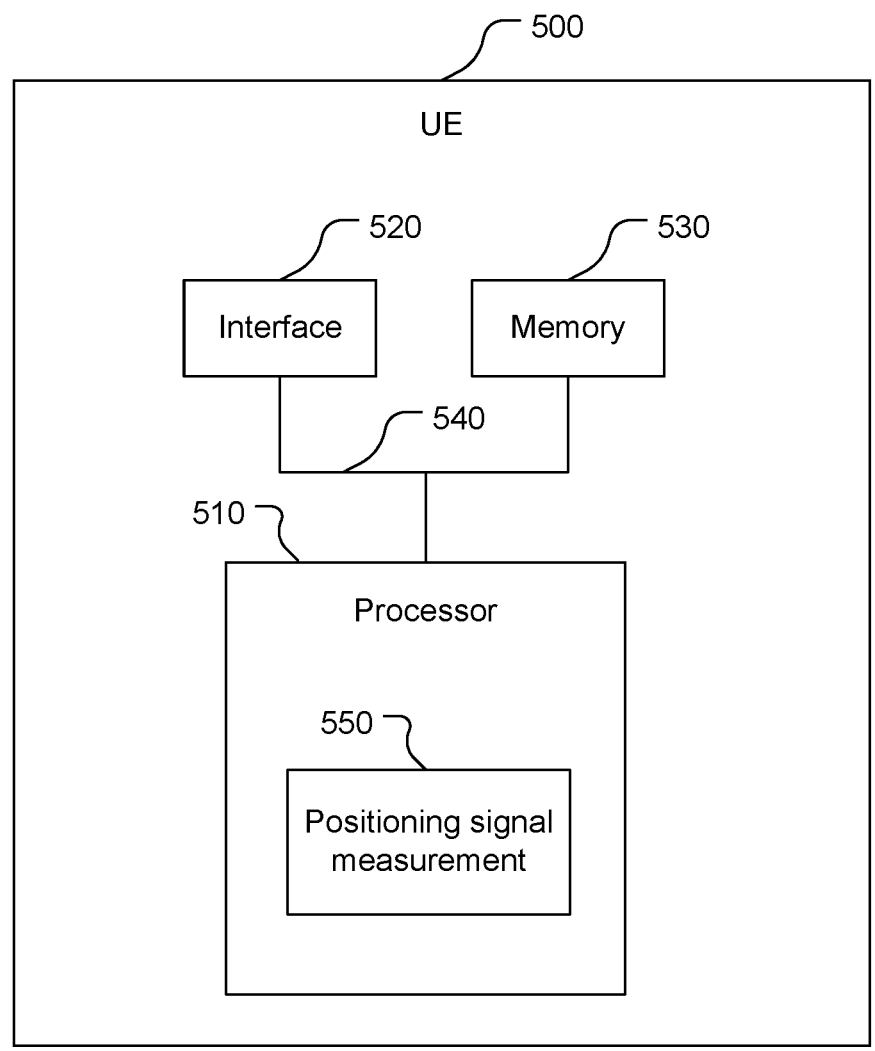
FIG. 5 is a block diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include the components shown in FIG. 5, and may include one or more other components such as any of those shown in FIG. 2 such that the UE 200 may be an example of the UE 500. For example, the processor 510 may include one or more of the components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The memory 530 may be configured similarly to the memory 211, e.g., including software with processor-readable instructions configured to cause the processor 510 to perform functions.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) may include a positioning signal measurement unit 550. The positioning signal measurement unit 550 is discussed further below, and the description may refer to the processor 510 generally, or the UE 500 generally, as performing any of the functions of the positioning signal measurement unit 550.

Figure 6:
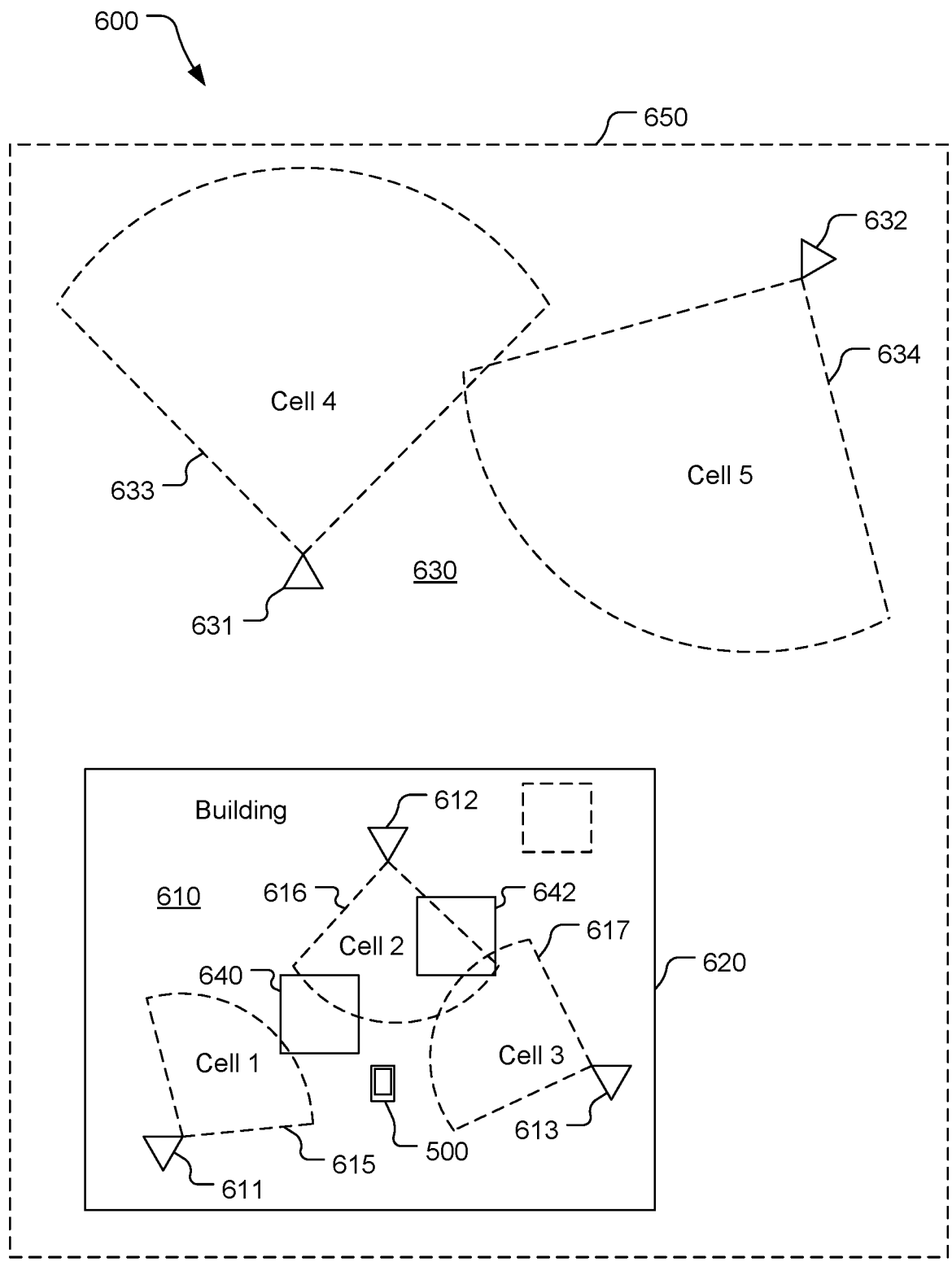
FIG. 6 is a simplified top view of an environment for positioning including an indoor region and outdoor region.

Referring to FIG. 6, an environment 600 includes an indoor region 610, inside a building 620, and an outdoor region 630 outside of the building 620. Base stations 611, 612, 613 are disposed in the indoor region 610 and provide cells 615, 616, 617 (labeled Cell 1, Cell 2, Cell 3), respectively, for providing signals to and/or receiving signals from the UE 500. The indoor region 610 may include many base stations to provide communication coverage due to objects affecting signal propagation such as a workstation 640, a cabinet 642, walls (not shown), etc. The indoor region 610 may be an IoT environment. The outdoor region 630 includes base stations 631, 632 providing cells 633, 634. The outdoor region 630 may have a much lower density (base stations per unit area) than the indoor region 610, e.g., because there may be a lower density of objects affecting signal propagation. Further, positioning assistance data for SPS-based positioning may be the same over large areas such as areas even larger than the cells 633, 634, e.g., over a region 650 encompassing the indoor region 610 and the outdoor region 630. First positioning assistance data determined for a first region may differ from second positioning assistance data determined for a second region, but be usable in the second region to measure positioning signals. The avoidance of obtaining the second positioning assistance data may outweigh any difference in performance realized due to measuring positioning signals in the second region using the first positioning assistance data. For RAT-based positioning, such as in the indoor region 610 (or even the outdoor region 630), positioning assistance data may change across much smaller areas compared to SPS-based positioning.

Positioning assistance data may be provided to the UE 500 to help the UE 500 measure and/or process positioning signals, e.g., to reduce time to measure the signals and/or to improve the accuracy of the measurements. Positioning assistance data may include, for example, pathloss, spatial relation information, SSB (Synchronization Signal Block) information, PRS acquisition information (e.g., frequency, bandwidth, timing, coding, etc.) to help the UE 500 measure positioning signals. The same positioning assistance data may be used over different areas, e.g., different cells (e.g., different coverage areas (communication areas) of the cells), and may be used for different amounts of areas for different assistance data, e.g., corresponding to different technologies and/or positioning techniques. For example, the same GNSS assistance data may be used over large areas (e.g., hundreds or thousands of square meters) outside, such as the outside region 630, while the same assistance data for RAT-based technologies may be used over much smaller areas (e.g., tens of square meters or less), such as the indoor region 610. In both cases, however, the areas of common assistance data may include multiple differentiable areas, e.g., multiple cells. For example, an indoor environment, e.g., for IoT devices, may have many cells of small size (e.g., tens of square meters or less) but the same positioning assistance data may be used for one or more RAT-based technologies (e.g., RTT, OTDOA) over multiple cells (or other areas). For example, in the indoor region 610, the same positioning assistance data may be used for RTT for NR for each of the cells 615-617, and the same positioning assistance data may be used for OTDOA for NR for each of the cells 615-617, but the positioning assistance data for OTDOA may be different from the positioning assistance data for RTT.

Referring again to FIG. 4, with further reference to FIG. 5, the processor 410 (possibly in conjunction with the memory 411 and, as appropriate, (one or more portions of) the transceiver 415) includes a positioning assistance unit 460. The positioning assistance unit 460 may be configured to determine and/or provide assistance data to the UE 500 for use in measuring positioning signals, e.g., SPS signals, PRS signals. The assistance data may be provided directly to the UE 500 from the server 400 or indirectly (e.g., via the TRP 300). The positioning assistance unit 460 may be configured to determine the assistance data, and/or to determine multiple areas where the same assistance data is applicable (applicability areas) and to provide the UE 500 with indications of the areas of applicability of positioning assistance data. For example, the positioning assistance unit 460 may determine and provide indications of groups of positioning assistance data and corresponding areas in which the assistance data are applicable, i.e., the multiple areas (e.g., cells) for each group of positioning assistance data in which the corresponding assistance data may be used. The assistance data for different areas may be the same, or may be different but assistance data for one area may still be helpful if used in a different area (e.g., being similar although not identical). The positioning assistance unit 460 is discussed further below, and the description may refer to the processor 410 generally, or the server 400 generally, as performing any of the functions of the positioning assistance unit 460.

Referring also to FIG. 7, the positioning assistance unit 460 may be configured to determine and provide group positioning assistance information contained in a positioning assistance data table 700. The table 700 includes a positioning assistance data group field 710, a positioning assistance data type field 720, a positioning assistance data message(s) field 730, an areaScope field 740, a frequency layer field 750, and an expiration field 760. The unit 460 may not determine and/or provide information of one or more of the fields 710, 720, 730, 740, 750, 760. For example, the unit 460 may not provide the group field 710, the data type field 720, and/or the frequency layer field 750. Values of parameters in the areaScope field 740 indicate to which area(s) the corresponding positioning assistance data are applicable. A value for the areaScope parameter indicating multiple areas means that the corresponding positioning assistance data message(s) may be used for each of the indicated areas such that the assistance data are applicable to each of the areas indicated by the areaScope parameter. The positioning assistance data message(s) field 730 may contain the messages (including the assistance data) or may contain indications of the messages but not the actual messages (or at least not the complete messages). Thus, the parameters in the field 730 may inform the UE 500 that the assistance data of the indicated messages may be used for all the indicated areas in the field 740 without providing the assistance data (which the UE 500 can obtain by reading the respective messages). The positioning assistance data messages may be, as assumed throughout herein as an example, positioning System Information Blocks (posSIBs). In the table 700, which is a non-limiting example, the positioning assistance data messages in the field 730 include the assistance data, and thus the parameters in the field 730 for Group 1 have values of posSIB-A1, posSIB-B1, posSIB-C1, and these values differ from values in the field 730 for Group 2, i.e., values posSIB-A2, posSIB-B2, posSIB-C2.

The positioning assistance unit 460 may, as in the example shown in FIG. 7, divide posSIBs into groups with corresponding applicability areas of positioning assistance data, with the groups being functions of one or more positioning assistance data characteristics. A positioning assistance data characteristic may be, for example, a positioning assistance data type (e.g., SPS, RAT-based positioning technology generally (i.e., any RAT-based technology), a specific RAT-based positioning technology (e.g., RTT, OTDOA, etc.) for which the positioning assistance data are applicable), a positioning assistance data name, or one or more frequency layers to which the assistance data are applicable, etc. In the example table 700, the same positioning assistance data (e.g., posSIB-A, posSIB-B, posSIB-C) are applicable in any frequency layer of Cell 1, because no specific frequency layer(s) is(are) specified in the frequency layer field 750 for Group 1. While the positioning assistance data in the Table 700 for each positioning technology are consistent over the indicated areas, positioning assistance data (and corresponding positioning assistance data messages) within the same positioning assistance data type may not be the same for a particular area. For example, posSIB-A2, posSIB-B2, and posSIB-C2 may apply to Cell 2, and posSIB-A2 and posSIB-B2 also apply to Cell 3, but posSIB-CX (where X≠2) apply to Cell 3. Further, while each of the groups shown in the Table 700 include multiple positioning assistance data messages (even Group 6 and Group 7 have multiple messages because the single indicated message for each Group applies to multiple frequency layers), a group may have a single message, e.g., a single message corresponding to a single frequency layer. As shown, groups of SPS assistance data may have different values inside (Cells 1, 2, 3) and outside (Cells 4, 5), but may have the same assistance data within the inside cells and may have the same assistance data within the outside cells. This, however, is an example, and there may be other values for other outside cells and/or for other inside cells, e.g., for larger outside areas and/or larger inside areas. Also as shown, RAT-based technologies have different assistance data values inside and outside (e.g., Groups 1 and 2 versus Group 8, and Groups 3 and 4 versus Group 9). Also as shown, positioning assistance data (e.g., all positioning assistance data for the indicated applicability area(s)) may be the same for a frequency layer. In this example, as indicated by Group 5, all posSIBs for frequency layer 3 will be the same for Cells 1, 2, and 3.

The indicated groups, and thus the indicated positioning assistance data message, areaScope, and frequency layer combinations may be valid for respective limited amounts of time. Values in the expiration field 760 indicate expiration times for the other related information, i.e., the other information in the group. In this example, the expiration times are indicated as specific times in terms of day (D), hour (H), and minute (M). Thus, when the indicated respective day, hour, and minute is reached (or completed), the corresponding positioning assistance data become invalid. The format of day, hour, and minute for the expiration field 760 is an example, and other formats of expiration times may be used (e.g., a duration (e.g., number of hours and/or minutes) referenced to a timestamp of the respective positioning assistance data message).

Figure 8:
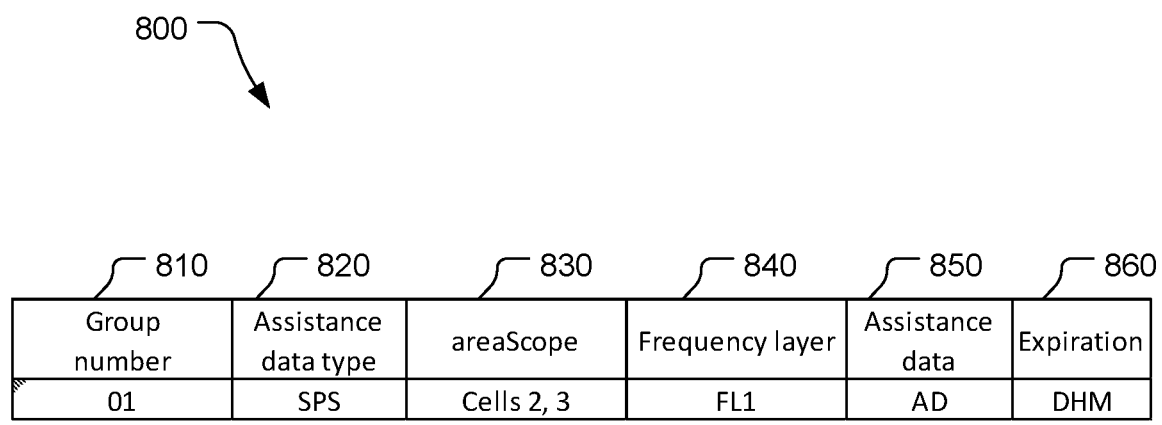
FIG. 8 is a simplified example of a positioning assistance message.

The areas corresponding to positioning assistance data may be provided in a variety of manners. For example, a bitmap may be used to indicate to which group positioning assistance data belongs. For example, if there were two groups possible (e.g., SPS-based positioning assistance data and RAT-based positioning assistance data), then a bit may be provided for each set of positioning assistance data (e.g., each positioning assistance data message), with a 0 indicating one group (e.g., SPS-based) and a 1 indicating the other group (e.g., RAT-based). An example bit map for such a scenario with six messages for SPS-based positioning assistance data and four messages for RAT-based positioning assistance data could be 0000001111. As another example, for a situation with four groups (groups 0-3), two bits may correspond to each positioning assistance data message. A bitmap of 00001010101111 may indicate that the first two messages are in group 0, the next three messages are in group 2, and the next two messages are in group 3. As another example, each positioning assistance data message may include an index indicating a group to which the message belongs. Using the example above of four groups, the first two messages would include an index of 00, the next three messages would include an index of 10, and the next two messages would include an index of 11. For example, referring to FIG. 8, a positioning assistance data message 800 may include a group number field 810, an assistance data type field 820, an areaScope field 830, a frequency layer field 840, an assistance data field 850, and an expiration field 860, with a value of the group number field 810 in this example being 01. The positioning assistance data message 800 is an example, and other forms of positioning assistance data messages may be used. For example, the assistance data type field 820 may be omitted, e.g., with the assistance data type being known based on an agreed-upon protocol (e.g., where the positioning assistance data message 800 is in relation to other transmitted information). The positioning assistance data message 800 includes other group-related information (i.e., in addition to group number), here including the applicability area(s) and frequency layer(s). Alternatively, other information for the groups could be provided in a separate message indicating groups and corresponding area(s), frequency layer(s), etc.

Referring again to FIG. 5, with further reference to FIGS. 1-4 and 6-8, the processor 510 (possibly in conjunction with the memory 530 and, as appropriate, the interface 520) includes a positioning signal measurement unit 550 configured to measure positioning signals (e.g., SPS signals, PRS signals) for use in determining a position estimate for the UE 500. The description may refer to the processor 510 generally, or the UE 500 generally, as performing any of the functions of the positioning signal measurement unit 550. The positioning signal measurement (PSM) unit 550 may be configured to store assistance data in association with the area(s) of applicability of the assistance data and any other relevant information (e.g., positioning assistance data type (e.g., SPS-based, RAT-based), positioning assistance data message type (e.g., SPS-based, RAT-based), positioning assistance data message name (e.g., posSibType1-2, posSibType2-12, etc.), frequency layer, etc.). The PSM unit 550 may be configured to determine whether to obtain new positioning assistance data or to use stored positioning assistance data to measure one or more positioning signals. For example, the PSM unit 550 may respond to the UE 500 entering a new area (e.g., being handed over to a different serving base station, and thus being in a different cell, or moving to a new geographic region, e.g., as determined by dead reckoning, analyzing a signal heatmap, and/or analyzing a base station neighbor list, etc.) by determining assistance data to be measured and whether those data are stored in the memory 530. The PSM unit 550 may, for example, determine a positioning assistance data message to be measured, determine whether assistance data for that message is stored in the memory 530, and if so whether an area scope for that assistance data includes the new area (e.g., the new serving cell). For example, if the UE 500 was in Cell 1 and obtained and stored positioning assistance data for RAT-based OTDOA in frequency layer 1, corresponding to Group 3 in the table 700, and moves to Cell 2, the PSM unit 550 may determine that the stored positioning assistance data is valid in Cell 2. The PSM unit 550 may determine whether the stored positioning assistance is still valid (i.e., has not expired). The PSM unit 550 may determine that the UE 500 need not read the assistance data again in response to determining that the stored positioning assistance data are applicable to the new area and have not expired. For example, the PSM unit 550 may inhibit the UE 500 from leaving RRC idle mode and entering RRC active mode in order to measure the assistance data because the memory 530 already has those assistance data stored. The PSM unit 550 may retrieve the positioning assistance data from the memory 530 and use these data to measure an incoming positioning signal (in this example, a PRS signal). This may help save battery power of the UE 500 by avoiding duplicative reading and processing of positioning assistance data.

Figure 9:
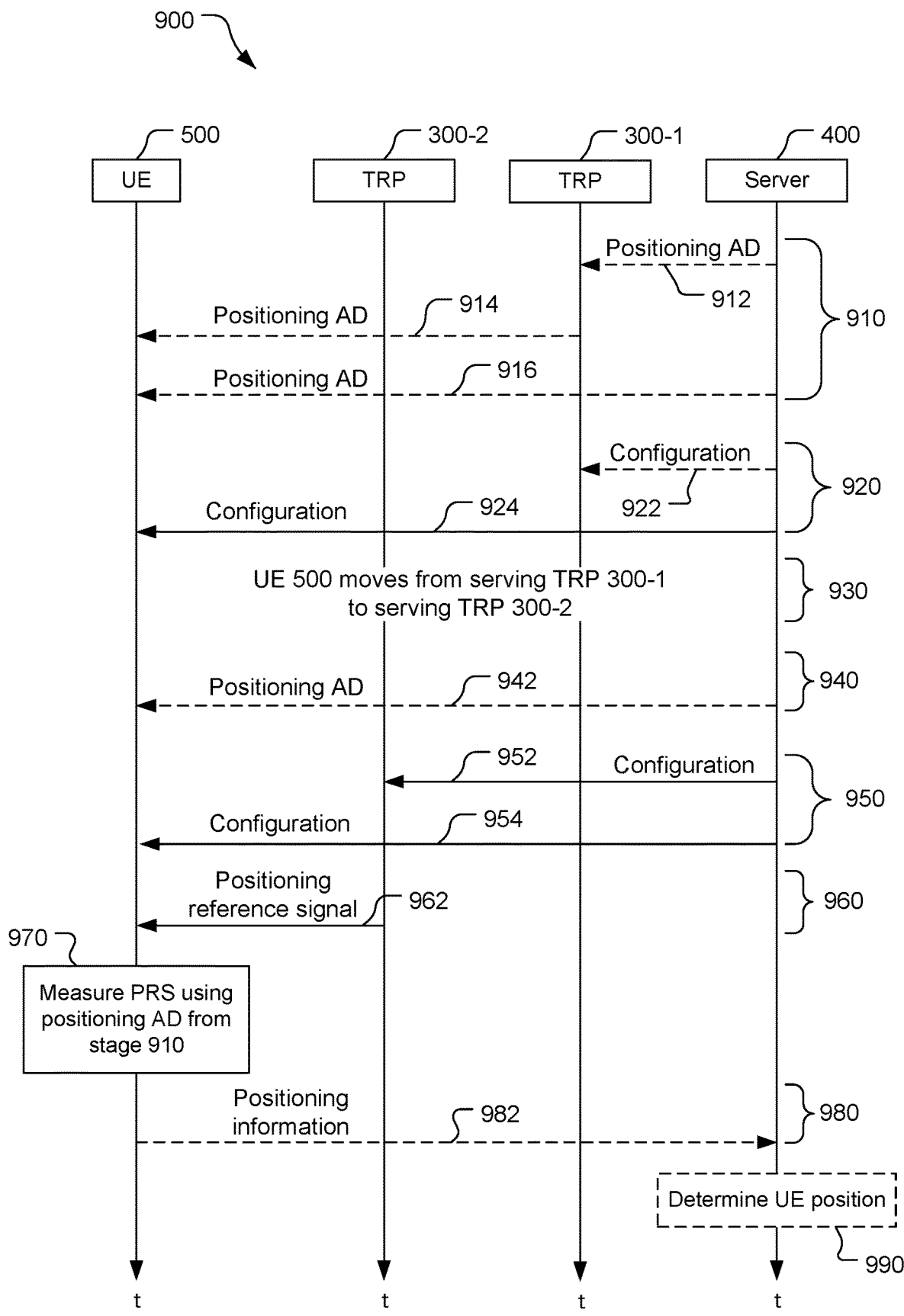
FIG. 9 is a timing diagram of signal and processing flow for determining positioning information using positioning assistance data applicable to multiple areas

Referring to FIG. 9, with further reference to FIGS. 1-8, a signaling and process flow 900 for determining positioning information using positioning assistance data applicable to multiple areas includes the stages shown. The signaling and process flow 900 is an example, as stages may be added, rearranged, and/or removed. For example, stages 980 and 990 may be omitted. In the signaling and process flow 900, the TRP 300-1 is initially a serving TRP for the UE 500, and the UE 500 later transitions (at stage 930) to having the TRP 300-2 be the serving TRP for the UE 500.

At stage 910, the server 400 (e.g., an LMF) transmits positioning assistance data (AD) to the UE 500. For example, positioning assistance unit 460 of the server 400 may determine and/or provide different positioning AD for different areas of applicability and/or different frequency layers. The positioning assistance unit 460 may, for example, provide different positioning AD for SPS-based positioning and for RAT-based positioning, with corresponding area scopes. Multiple area scopes may be provided for the same type of positioning AD, with the same or different AD values. For example, the unit 460 may divide posSIBs into two or more posSIB groups and specify an areaScope value for each posSIB group. Also or alternatively, the unit 460 may specify different areaScope values for different frequency layers (e.g., within a posSIB group). The server 400 may provide indications of the applicability areas for positioning AD (e.g., the table 700) directly to the UE 500 in a positioning AD message 916, or via the TRP 300-1 by a positioning AD message 912 to the TRP 300-1 which provides the positioning AD in a positioning AD message 914 to the UE 500. The positioning AD may be provided together with the indications of applicability areas or separately. The positioning AD may be provided in a positioning AD message such as the positioning assistance data message 800. Indications of multiple areas of applicability of positioning assistance data may be provided with the positioning assistance data (e.g., in the positioning assistance data message 800) or separately from the positioning assistance data (e.g., in the table 700 with positioning assistance data provided separately).

At stage 920, the server 400 may transmit positioning configuration information to the UE 500 and possibly to the TRP 300-1. For example, the server 400 may send a configuration message 922 with PRS configuration instructions to the TRP 300-1. The configuration message 922 may be symbolic, e.g., with the server 400 and the TRP 300-1 negotiating the positioning configuration information as symbolized by the configuration message 922 being transmitted to the TRP 300-1. While FIG. 9 shows one configuration message being sent to one TRP, multiple PRS instructions may be sent by the server 400 to multiple TRPs for sending PRS. The server 400 may send a configuration message 924 to the UE 500 with positioning signal configuration information. The configuration message 924 may indicate the PRS configuration of the TRP 300-1 to facilitate the UE 500 measuring and processing the PRS from the TRP 300-1. The configuration message 924 may also or alternatively include satellite vehicle positioning signal information for acquiring SPS signals. The configuration message 924 is shown being transmitted directly from the server 400 to the UE 500, but may be transmitted via the TRP 300-1.

At stage 930, the UE 500 transitions from having the TRP 300-1 as a serving TRP to having the TRP 300-2 as a serving TRP. For example, the UE 500 may move from being within the cell 615 to being in the cell 616 and be handed over from the base station 611 to the base station 612.

At stage 940, the server 400 may transmit positioning assistance data to the UE 500. For example, the server 400 may send a positioning AD message 942 to the UE 500 directly as shown, or via the TRP 300-2 similar to the discussion of stage 910. The server 400 may not send the positioning AD message 942 if the same positioning AD can be used by the UE 500 that the server 400 previously sent to the UE 500. For example, if the server 400 previously sent the table 700 and the UE 500 is using the Group 3 positioning assistance data, then because the same positioning assistance data may be used for cell 616, the UE 500 does not need to read more positioning assistance data if the Group 3 positioning assistance data has not expired. The server 400 may, however, send the positioning AD message 942, e.g., because the server 400 may not know whether the UE 500 stored the positioning assistance data for use in other cells.

At stage 950, the server 400 may transmit positioning configuration information to the TRP 300-2 and possibly to the UE 500. For example, the server 400 may send a configuration message 952 with PRS configuration instructions to the TRP 300-2. The configuration message 952 may be symbolic, e.g., with the server 400 and the TRP 300-2 negotiating the PRS configuration as symbolized by the configuration message 952 being transmitted to the TRP 300-2. The server 400 may send a configuration message 954 to the UE 500 with positioning signal configuration information. The configuration message 954 may indicate the PRS configuration of the TRP 300-2 to facilitate the UE 500 measuring and processing the PRS from the TRP 300-2. The configuration message 954 may also or alternatively include satellite vehicle positioning signal information for acquiring SPS signals. The configuration message 954 is shown being sent directly from the server 400 to the UE 500, but may be sent from the server 400 via the TRP 300-2, or may be sent by the TRP 300-2 to the UE 500.

At stage 960, the UE 500 receives a positioning signal. In this example, the TRP 300-2 sends a PRS 962 that is received by the UE 500.

At stage 970, the UE 500 measures the positioning signal, in this example the PRS sent from the TRP 300-2, using the positioning assistance data received in stage 910. For example, the positioning signal measurement unit 550 may determine which positioning assistance data the UE 500 will use for measuring the PRS 962, based on the positioning method (and thus the signal to be measured) and/or the frequency layer, the area scope of the positioning assistance data, and the expiration time of the positioning assistance data. The positioning signal measurement unit 550 may determine that previously-stored positioning assistance data for an area (e.g., the cell 615) for the positioning signal to be measured is applicable to the present area (e.g., cell) of the UE 500 and is still valid (regardless of whether the previously-stored positioning assistance data was used by the UE 500 to measure a positioning signal). The unit 500 may respond to this determination by using the previously-stored assistance data to measure the positioning reference signal 962 without reading additional positioning assistance data, e.g., from the message 942. For example, having Group 3 information of the table 700 previously stored, and having moved into Cell 2, the UE 500 may use the Group 3 positioning assistance data to measure the PRS 962. Consequently, the UE 500 may avoid changing from RRC idle mode to RRC active mode to read more positioning assistance data, thus avoiding battery power, processing power, and time to measure additional positioning assistance data, thus saving power and/or reducing latency relative to measuring the additional positioning assistance data.

Whether positioning assistance data are applicable to an area may be determined in a variety of ways. For example, the same positioning assistance data may be include in positioning messages for different areas. As another example, a neural network (e.g., of the server 400, a TRP 300, and/or another entity) that is locale specific may analyze historical data, including patterns of data, to derive a probabilistic model of which positioning assistance data may be used for multiple areas, and for which areas the positioning assistance data are applicable (e.g., yields sufficient accuracy and/or latency when measuring positioning signals). For example, one or more algorithms may recognize one or more relationships between positioning assistance data and positioning signal measurement performance to determine whether the use of the same positioning assistance data will yield positioning accuracy of acceptable accuracy while providing one or more benefits, e.g., reduced power consumption, reduced latency, etc.

At stage 980, the UE 500 may transmit positioning information to the server 400 in a positioning information message 982. The positioning information message 982 may include raw signal information and/or processed positioning signal information such as a positioning reference signal measurement and/or a position of the UE 500. The determined position of the UE 500 may be called a position estimate.

At stage 990, the server 400 may determine the position of the UE 500. The server 400 may collect positioning information from one or more positioning information messages 982 and perform one or more positioning techniques to determine the location of the UE 500. For example, if multiple positioning information messages 982 include position estimates, the server 400 may combine (e.g., average) the estimates. As another example, the server 400 may combine (e.g., average) raw measurements and/or processed measurements (e.g., pseudoranges) to determine a position estimate for the UE 500. The server 400 may use positioning information from the message(s) 982 to update a previously-determined position for the UE 500.

Figure 10:
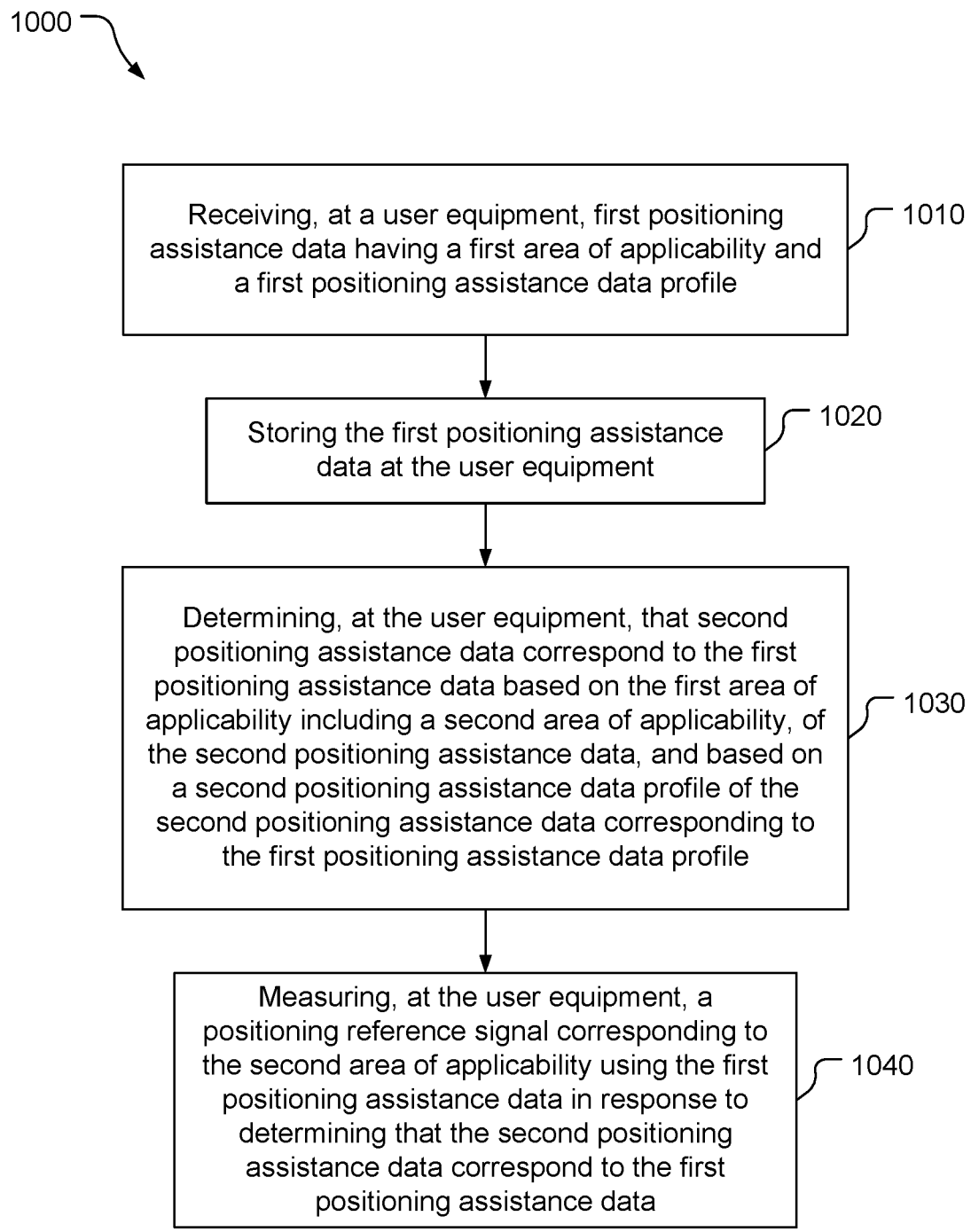
FIG. 10 is a block flow diagram of a signal measuring method.

Referring to FIG. 10, with further reference to FIGS. 1-11, a signal measuring method 1000 includes the stages shown. The method 1000 is, however, an example only and not limiting. The method 1000 may be altered, e.g., by having stages added, removed, rearranged, combined, performed concurrently, and/or having single stages split into multiple stages.

At stage 1010, the method 1000 includes receiving, at a user equipment, first positioning assistance data having a first area of applicability and a first positioning assistance data profile. For example, the UE 500 may receive (e.g., from the server 400 at stage 910) positioning assistance data for one cell, e.g., the cell 615, and that positioning assistance data may also be applicable (able to be used for measuring positioning signals) in another cell, e.g., the cell 616. The processor 510, the memory 530, and the interface 520 (e.g., the wireless receiver 244 and the antenna 246) may comprise means for receiving the positioning assistance data.

At stage 1020, the method 1000 includes storing the first positioning assistance data at the user equipment. For example, the UE 500 may store the first positioning assistance data in the memory 530 for later access. The processor 510 and the memory 530 may comprise means for storing the first positioning assistance data.

At stage 1030, the method 1000 includes determining, at the UE, that second positioning assistance data correspond to the first positioning assistance data based on the first area of applicability including a second area of applicability, of the second positioning assistance data, and based on a second positioning assistance data profile of the second positioning assistance data corresponding to the first positioning assistance data profile. For example, the UE 500 may determine that if second positioning assistance data corresponding to a positioning assistance data type, or a specific positioning assistance message, is to be used to measure a positioning signal (e.g., a PRS of a cell that the UE 500 has moved into) and that the first positioning assistance data corresponding to this positioning data type or positioning assistance message are applicable to the area that the UE 500 is in, then the second positioning assistance data correspond to the first positioning assistance data. The area that the UE 500 is in may be the same area as the applicability area of the first positioning assistance data or may be a subset of the applicability area of the first positioning assistance data. Also or alternatively, the UE 500 may determine that a frequency layer of the first and second positioning assistance data is the same in order to determine that the second positioning assistance data correspond to the first positioning assistance data. The processor 510, the memory 530, and the interface 520 (e.g., the wireless receiver 244 and the antenna 246) may comprise means for determining that the second positioning assistance data correspond to the first positioning assistance data.

At stage 1040, the method 1000 includes measuring, at the user equipment, a positioning signal corresponding to the second area of applicability using the first positioning assistance data in response to determining that the second positioning assistance data correspond to the first positioning assistance data. For example, the UE 500 may use the positioning assistance data received at stage 910 to measure the PRS 962 received at stage 960 independently of whether the UE 500 measures the positioning assistance data received at stage 940, if such data are received. The processor 510, the memory 530, and the interface 520 (e.g., the wireless receiver 244 and the antenna 246) may comprise means for measuring the positioning signal.

Implementations of the method 1000 may include one or more of the following features. In an example implementation, the UE 500 may receive an indication of the multiple areas of applicability of the positioning assistance data received at stage 1010, e.g., the applicability of the positioning assistance data to the cell 615 and to the cell 616. The processor 510, the memory 530, and the interface 520 (e.g., the wireless receiver 244 and the antenna 246) may comprise means for receiving the indication of a positioning assistance data area of applicability for each of the plurality of positioning assistance data groups. In another example implementation, measuring the positioning signal comprises measuring the positioning signal based on the first positioning assistance data, without reading the second positioning assistance data from a positioning assistance message, in response to determining that the second positioning assistance data correspond to the first positioning assistance data. For example, the UE 500 may not leave RRC idle mode in order to read the second positioning assistance data received in the positioning AD message 942. The UE 500 may read a portion of the message 942 but avoid reading the positioning assistance data. In another example implementation, the method 1000 may include: receiving, at the user equipment from a network entity, an indication of a positioning assistance data area of applicability for each of a plurality of positioning assistance data groups; and determining, at the user equipment, the second area of applicability to be the positioning assistance data area of applicability corresponding to a particular positioning assistance data group, of the plurality of positioning assistance data groups, that comprises an indication of the second positioning assistance data. For example, the UE 500 may receive the table 700 or other indications of areas of applicability (e.g., areaScope values) of groups of positioning assistance data, e.g., positioning assistance data types, positioning assistance data messages, etc., and determine that the area of applicability of positioning assistance data to be used to measure the positioning signal is the area of applicability that corresponds to an indication of the second positioning assistance data. The processor 510, the memory 530, and the interface 520 (e.g., the wireless receiver 244 and the antenna 246) may comprise means for receiving the indication of positioning assistance data area of applicability, and the processor 510 and the memory 530 may comprise means for determining the second area of applicability.

Also or alternatively, implementations of the method 1000 may include one or more of the following features. In an example implementation, the second positioning assistance data profile comprises an indicated frequency layer and the method 1000 may include: receiving, at the user equipment from a network entity, a plurality of indications indicating positioning assistance data areas of applicability and associated frequency layers including a particular positioning assistance data area of applicability with a particular associated frequency layer that comprises the indicated frequency layer; and determining, at the user equipment, the second area of applicability to be the particular positioning assistance data area of applicability based on the particular associated frequency layer comprising the indicated frequency layer. For example, the UE 500 may receive an indication of area scope corresponding to a frequency layer for positioning assistance data, e.g., as shown for Group 5 in the table 700. The UE 500 may use the indicated area of applicability (e.g., areaScope value) as the second area of applicability in order to determine whether previously-stored positioning assistance data may be used for measuring the positioning signal (e.g., are the same as the second positioning assistance data). The processor 510, the memory 530, and the interface 520 (e.g., the wireless receiver 244 and the antenna 246) may comprise means for receiving the indication of positioning assistance data area of applicability, and the processor 510 and the memory 530 may comprise means for determining the second area of applicability. In a further example implementation, the plurality of indications further indicate positioning assistance data groups associated with the positioning assistance data areas of applicability, the particular positioning assistance data area of applicability being associated with a particular positioning assistance data group of the positioning assistance data groups, and the second area of applicability may be determined to be the particular positioning assistance data area of applicability based further on the particular positioning assistance data group comprising an indication of the second positioning assistance data. For example, the areaScope may correspond to a positioning assistance data group and a frequency layer, e.g., such that different areaScope values may correspond to the same positioning assistance data group and different frequency layers (e.g., Groups 3 and 4 in the table 700) or different areaScope values may correspond to the same frequency layer and different positioning assistance data groups.

Also or alternatively, implementations of the method 1000 may include one or more of the following features. In an example implementation, the method 1000 may include reading, at the user equipment, the second positioning assistance data from a positioning assistance message, and measuring, at the user equipment, the positioning reference signal using the second positioning assistance data, in response to determining that the second positioning assistance data are different from the first positioning assistance data. For example, if previously-stored positioning assistance data are not applicable to measuring the positioning signal (e.g., because the stored positioning assistance data are not associated with a present region of the UE 500), then the UE 500 may read the positioning assistance data, for measuring the positioning signal, from a positioning assistance message. The processor 510, the memory 530, and the interface 520 (e.g., the wireless receiver 244 and the antenna 246) may comprise means for reading the second positioning assistance data. The processor 510, the memory 530, and the interface 520 (e.g., the wireless receiver 244 and the antenna 246) may comprise means for determining that the second positioning assistance data and the first positioning assistance data differ. The processor 510, the memory 530, and the interface 520 (e.g., the wireless receiver 244 and the antenna 246) may comprise means for measuring the positioning signal in response to determining that the second positioning assistance data and the first positioning assistance data differ. In another example implementation, the method 1000 may comprise determining the second positioning assistance data based on a positioning method. For example, the UE 500 may look for a positioning assistance data group corresponding to the positioning technique to be used by the UE 500 to process the positioning signal, and use the positioning assistance data corresponding to such positioning assistance data group to measure the positioning signal. The processor 510 and the memory 530 may comprise means for determining the second positioning assistance data based on the positioning method. In another example implementation, the method 1000 may comprise determining whether the first positioning assistance data have expired. For example, the UE 500 may analyze the value in the expiration field 760 compared to a present time to determine whether stored positioning assistance data are still valid (before and/or after determining whether the stored positioning assistance data are applicable to the present region of the UE 500). The processor 510, the memory 530, and the interface 520 (e.g., the wireless receiver 244 and the antenna 246) may comprise means for determining whether the first positioning assistance data have expired. In another example implementation, the method 1000 may comprise obtaining the second area of applicability from a positioning assistance message containing the second positioning assistance data. For example, the UE 500 may receive the positioning AD message 942 and use an area of applicability in the message 942 to determine whether that area of applicability is within the area of applicability of previously-stored positioning assistance data for measuring the positioning signal. The processor 510, the memory 530, and the interface 520 (e.g., the wireless receiver 244 and the antenna 246) may comprise means for obtaining the second area of applicability. In another example implementation, the method 1000 may comprise using a present serving cell of the user equipment as the second area of applicability. For example, the UE 500 may determine a new serving cell upon handover between TRPs and may use the new serving cell as the area of applicability of positioning assistance data to determine whether the UE 500 already has positioning assistance data stored for measuring the positioning signal. The processor 510, the memory 530, and the interface 520 (e.g., the wireless receiver 244 and the antenna 246) may comprise means for using a present serving cell as the second area of applicability.

Figure 11:
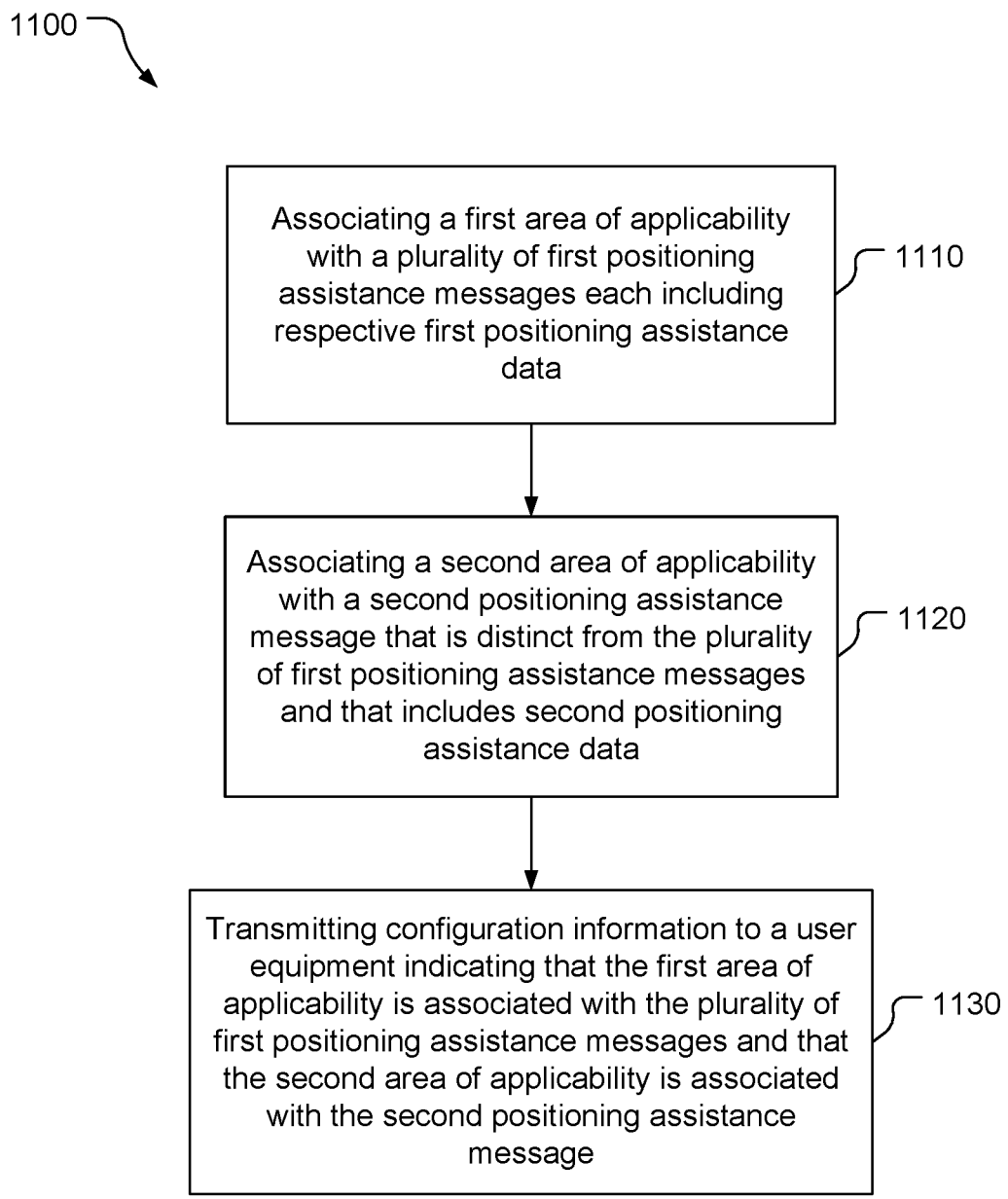
FIG. 11 is a block flow diagram of a configuration method.

Referring to FIG. 11, with further reference to FIGS. 1-10, a configuration method 1100 includes the stages shown. The method 1100 is, however, an example only and not limiting. The method 1100 may be altered, e.g., by having stages added, removed, rearranged, combined, performed concurrently, and/or having single stages split into multiple stages.

At stage 1110, the method 1100 includes associating a first area of applicability with a plurality of first positioning assistance messages each including respective first positioning assistance data. For example, the server 400 may associate one or more cells with a set of posSIBs (e.g., as shown in the table 700). Each first positioning assistance message may include multiple messages (e.g., with one message including an indication of positioning assistance data and another message including the positioning assistance data). The plurality of first positioning assistance messages may comprise the same positioning assistance message corresponding to multiple frequency layers (e.g., Groups 6 and 7 of the table 700). The plurality of first positioning assistance messages may comprise multiple positioning assistance messages each corresponding to multiple frequency layers (e.g., Groups 1, 2, 8, and 9 of the table 700). The plurality of first positioning assistance messages may comprise multiple positioning assistance messages each corresponding to a single frequency layer (e.g., Groups 3-5 of the table 700). The processor 410 and the memory 411 may comprise means for associating a first area of applicability with a plurality of first positioning assistance messages.

At stage 1120, the method 1100 includes associating a second area of applicability with a second positioning assistance message that is distinct from the plurality of first positioning assistance messages and that includes second positioning assistance data. For example, the server 400 may associate one or more cells with at least one posSIB (e.g., as shown in the table 700). The processor 410 and the memory 411 may comprise means for associating a second area of applicability with a second positioning assistance message.

At stage 1130, the method 1100 includes transmitting configuration information to a user equipment indicating that the first area of applicability is associated with the plurality of first positioning assistance messages and that the second area of applicability is associated with the second positioning assistance message. For example, the server 400 may send the table 700, positioning assistance messages such as the positioning assistance data message 800, and/or one or more other indications of positioning assistance messages and corresponding areas of applicability. The configuration information may be sent with a group indication, identifying the plurality of first positioning assistance messages, separately from the plurality of first positioning assistance messages. For example, the server 400 may send information identifying a positioning assistance data type (e.g., RTT, OTDOA) for the first positioning assistance messages along with the area(s) of applicability and the messages (including the positioning assistance data) may be sent separately (e.g., later). The processor 410, the memory 411, and the transceiver 415 (e.g., the wireless transmitter 442 and the antenna 446) may comprise means for transmitting the configuration information.

Implementations of the method 1100 may include one or more of the following features. In an example implementation, the method 1100 may include causing a network entity to transmit the configuration information with a group indication, identifying the plurality of first positioning assistance messages, in each of the plurality of first positioning assistance messages. For example, the server 400 may send one or more instructions to the TRP 300 to send the positioning assistance data message 800 indicating the group in the group number field 810. The processor 410, the memory 411, and the transceiver 415 (e.g., the wireless transmitter 442 and the antenna 446) may comprise means for causing a network entity to transmit the configuration information with a group indication.

Implementation Examples

Implementation examples are provided in the following numbered clauses.

1. A user equipment comprising:
a transceiver;
a memory; and
a processor, communicatively coupled to the transceiver and the memory, and configured to:
receive, via the transceiver, first positioning assistance data having a first area of applicability and a first positioning assistance data profile;
store the first positioning assistance data in the memory;
determine that second positioning assistance data correspond to the first positioning assistance data based on the first area of applicability including a second area of applicability, of the second positioning assistance data, and based on a second positioning assistance data profile of the second positioning assistance data corresponding to the first positioning assistance data profile; and
measure a positioning signal corresponding to the second area of applicability using the first positioning assistance data in response to determining that the second positioning assistance data correspond to the first positioning assistance data.

2. The user equipment of clause 1, wherein to measure the positioning signal the processor is configured to measure the positioning signal based on the first positioning assistance data, without reading the second positioning assistance data from a positioning assistance message, in response to determining that the second positioning assistance data correspond to the first positioning assistance data.

3. The user equipment of clause 1, wherein the processor is configured to:
receive, from a network entity via the transceiver, an indication of a positioning assistance data area of applicability for each of a plurality of positioning assistance data groups; and
determine the second area of applicability to be the positioning assistance data area of applicability corresponding to a particular positioning assistance data group, of the plurality of positioning assistance data groups, that comprises an indication of the second positioning assistance data.

4. The user equipment of clause 1, wherein the second positioning assistance data profile comprises an indicated frequency layer, and wherein the processor is configured to:
receive, from a network entity via the transceiver, a plurality of indications indicating positioning assistance data areas of applicability and associated frequency layers including a particular positioning assistance data area of applicability with a particular associated frequency layer that comprises the indicated frequency layer; and
determine the second area of applicability to be the particular positioning assistance data area of applicability based on the particular associated frequency layer comprising the indicated frequency layer.

5. The user equipment of clause 4, wherein the plurality of indications further indicate positioning assistance data groups associated with the positioning assistance data areas of applicability, the particular positioning assistance data area of applicability being associated with a particular positioning assistance data group of the positioning assistance data groups, and wherein the processor is configured to determine the second area of applicability to be the particular positioning assistance data area of applicability based further on the particular positioning assistance data group comprising an indication of the second positioning assistance data.

6. The user equipment of clause 1, wherein the processor is configured to read the second positioning assistance data from a positioning assistance message, and measure the positioning signal using the second positioning assistance data, in response to determining that the second positioning assistance data are different from the first positioning assistance data.

7. The user equipment of clause 1, wherein the processor is configured to determine the second positioning assistance data based on a positioning method.

8. The user equipment of clause 1, wherein the processor is configured to determine whether the first positioning assistance data have expired.

9. The user equipment of clause 1, wherein the processor is configured to obtain the second area of applicability from a positioning assistance message containing the second positioning assistance data.

10. The user equipment of clause 1, wherein the processor is configured to use a present serving cell of the user equipment as the second area of applicability.

11. A user equipment comprising:
means for receiving first positioning assistance data having a first area of applicability and a first positioning assistance data profile;
memory means for storing the first positioning assistance data;
means for determining that second positioning assistance data correspond to the first positioning assistance data based on the first area of applicability including a second area of applicability, of the second positioning assistance data, and based on a second positioning assistance data profile of the second positioning assistance data corresponding to the first positioning assistance data profile; and
means for measuring a positioning signal corresponding to the second area of applicability using the first positioning assistance data in response to determining that the second positioning assistance data correspond to the first positioning assistance data.

12. The user equipment of clause 11, wherein the means for measuring the positioning signal comprise means for measuring the positioning signal based on the first positioning assistance data, without reading the second positioning assistance data from a positioning assistance message, in response to determining that the second positioning assistance data correspond to the first positioning assistance data.

13. The user equipment of clause 11, further comprising:
means for receiving, from a network entity, an indication of a positioning assistance data area of applicability for each of a plurality of positioning assistance data groups; and
means for determining the second area of applicability to be the positioning assistance data area of applicability corresponding to a particular positioning assistance data group, of the plurality of positioning assistance data groups, that comprises an indication of the second positioning assistance data.

14. The user equipment of clause 11, wherein the second positioning assistance data profile comprises an indicated frequency layer, and wherein the user equipment further comprises:
means for receiving, from a network entity, a plurality of indications indicating positioning assistance data areas of applicability and associated frequency layers including a particular positioning assistance data area of applicability with a particular associated frequency layer that comprises the indicated frequency layer; and
means for determining the second area of applicability to be the particular positioning assistance data area of applicability based on the particular associated frequency layer comprising the indicated frequency layer.

15. The user equipment of clause 14, wherein the plurality of indications further indicate positioning assistance data groups associated with the positioning assistance data areas of applicability, the particular positioning assistance data area of applicability being associated with a particular positioning assistance data group of the positioning assistance data groups, and wherein the means for determining the second area of applicability comprise means for determining the second area of applicability to be the particular positioning assistance data area of applicability based further on the particular positioning assistance data group comprising an indication of the second positioning assistance data.

16. The user equipment of clause 11, further comprising means for reading the second positioning assistance data from a positioning assistance message, and for measuring the positioning signal using the second positioning assistance data, in response to determining that the second positioning assistance data are different from the first positioning assistance data.

17. The user equipment of clause 11, further comprising means for determining the second positioning assistance data based on a positioning method.

18. The user equipment of clause 11, further comprising means for determining whether the first positioning assistance data have expired.

19. The user equipment of clause 11, further comprising means for obtaining the second area of applicability from a positioning assistance message containing the second positioning assistance data.

20. The user equipment of clause 11, further comprising means for using a present serving cell of the user equipment as the second area of applicability.

21. A signal measuring method comprising:
receiving, at a user equipment, first positioning assistance data having a first area of applicability and a first positioning assistance data profile;
storing the first positioning assistance data at the user equipment;
determining, at the user equipment, that second positioning assistance data correspond to the first positioning assistance data based on the first area of applicability including a second area of applicability, of the second positioning assistance data, and based on a second positioning assistance data profile of the second positioning assistance data corresponding to the first positioning assistance data profile; and
measuring, at the user equipment, a positioning signal corresponding to the second area of applicability using the first positioning assistance data in response to determining that the second positioning assistance data correspond to the first positioning assistance data.

22. The method of clause 21, wherein measuring the positioning signal comprises measuring the positioning signal based on the first positioning assistance data, without reading the second positioning assistance data from a positioning assistance message, in response to determining that the second positioning assistance data correspond to the first positioning assistance data.

23. The method of clause 21, further comprising:
receiving, at the user equipment from a network entity, an indication of a positioning assistance data area of applicability for each of a plurality of positioning assistance data groups; and
determining, at the user equipment, the second area of applicability to be the positioning assistance data area of applicability corresponding to a particular positioning assistance data group, of the plurality of positioning assistance data groups, that comprises an indication of the second positioning assistance data.

24. The method of clause 21, wherein the second positioning assistance data profile comprises an indicated frequency layer, and wherein the method further comprises:
receiving, at the user equipment from a network entity, a plurality of indications indicating positioning assistance data areas of applicability and associated frequency layers including a particular positioning assistance data area of applicability with a particular associated frequency layer that comprises the indicated frequency layer; and
determining, at the user equipment, the second area of applicability to be the particular positioning assistance data area of applicability based on the particular associated frequency layer comprising the indicated frequency layer.

25. The method of clause 24, wherein the plurality of indications further indicate positioning assistance data groups associated with the positioning assistance data areas of applicability, the particular positioning assistance data area of applicability being associated with a particular positioning assistance data group of the positioning assistance data groups, and wherein the second area of applicability is determined to be the particular positioning assistance data area of applicability based further on the particular positioning assistance data group comprising an indication of the second positioning assistance data.

26. The method of clause 21, further comprising reading, at the user equipment, the second positioning assistance data from a positioning assistance message, and measuring, at the user equipment, the positioning signal using the second positioning assistance data, in response to determining that the second positioning assistance data are different from the first positioning assistance data.

27. The method of clause 21, further comprising determining the second positioning assistance data based on a positioning method.

28. The method of clause 21, further comprising determining whether the first positioning assistance data have expired.

29. The method of clause 21, further comprising obtaining the second area of applicability from a positioning assistance message containing the second positioning assistance data.

30. The method of clause 21, further comprising using a present serving cell of the user equipment as the second area of applicability.

31. A non-transitory, processor-readable storage medium comprising processor-readable instructions configured to cause a processor of a user equipment to:
receive first positioning assistance data having a first area of applicability and a first positioning assistance data profile;
store the first positioning assistance data;
determine that second positioning assistance data correspond to the first positioning assistance data based on the first area of applicability including a second area of applicability, of the second positioning assistance data, and based on a second positioning assistance data profile of the second positioning assistance data corresponding to the first positioning assistance data profile; and
measure a positioning signal from a second cell using the first positioning assistance data in response to determining that the second positioning assistance data correspond to the first positioning assistance data.

32. The storage medium of clause 31, wherein the processor-readable instructions configured to cause the processor to measure the positioning signal comprise processor-readable instructions configured to cause the processor to measure the positioning signal based on the first positioning assistance data, without reading the second positioning assistance data from a positioning assistance message, in response to determining that the second positioning assistance data correspond to the first positioning assistance data.

33. The storage medium of clause 31, further comprising processor-readable instructions configured to cause the processor to:
receive, from a network entity, an indication of a positioning assistance data area of applicability for each of a plurality of positioning assistance data groups; and
determine the second area of applicability to be the positioning assistance data area of applicability corresponding to a particular positioning assistance data group, of the plurality of positioning assistance data groups, that comprises an indication of the second positioning assistance data.

34. The storage medium of clause 31, wherein the second positioning assistance data profile comprises an indicated frequency layer, and wherein the storage medium further comprises processor-readable instructions configured to cause the processor to:
receive, from a network entity, a plurality of indications indicating positioning assistance data areas of applicability and associated frequency layers including a particular positioning assistance data area of applicability with a particular associated frequency layer that comprises the indicated frequency layer; and
determine the second area of applicability to be the particular positioning assistance data area of applicability based on the particular associated frequency layer comprising the indicated frequency layer.

35. The storage medium of clause 34, wherein the plurality of indications further indicate positioning assistance data groups associated with the positioning assistance data areas of applicability, the particular positioning assistance data area of applicability being associated with a particular positioning assistance data group of the positioning assistance data groups, and wherein the processor-readable instructions configured to cause the processor to determine the second area of applicability comprise processor-readable instructions configured to cause the processor to determine the second area of applicability to be the particular positioning assistance data area of applicability based further on the particular positioning assistance data group comprising an indication of the second positioning assistance data.

36. The storage medium of clause 31, further comprising processor-readable instructions configured to cause the processor to read the second positioning assistance data from a positioning assistance message, and measure the positioning signal using the second positioning assistance data, in response to determining that the second positioning assistance data are different from the first positioning assistance data.

37. The storage medium of clause 31, further comprising processor-readable instructions configured to cause the processor to determine the second positioning assistance data based on a positioning method.

38. The storage medium of clause 31, further comprising processor-readable instructions configured to cause the processor to determine whether the first positioning assistance data have expired.

39. The storage medium of clause 31, further comprising processor-readable instructions configured to cause the processor to obtain the second area of applicability from a positioning message containing the second positioning assistance data.

40. The storage medium of clause 31, further comprising processor-readable instructions configured to cause the processor to use a present serving cell of the user equipment as the second area of applicability.

41. A location server comprising:
a transceiver;
a memory; and
a processor, communicatively coupled to the transceiver and the memory, and configured to:
associate a first area of applicability with a plurality of first positioning assistance messages each including respective first positioning assistance data;
associate a second area of applicability with a second positioning assistance message that is distinct from the plurality of first positioning assistance messages and that includes second positioning assistance data; and
transmit configuration information via the transceiver indicating that the first area of applicability is associated with the plurality of first positioning assistance messages and that the second area of applicability is associated with the second positioning assistance message.

42. The location server of clause 41, wherein the plurality of first positioning assistance messages comprises a same positioning assistance message corresponding to multiple frequency layers.

43. The location server of clause 41, wherein the plurality of first positioning assistance messages comprises multiple positioning assistance messages each corresponding to multiple frequency layers.

44. The location server of clause 41, wherein the plurality of first positioning assistance messages comprises multiple positioning assistance messages each corresponding to a single frequency layer.

45. The location server of clause 41, wherein the processor is configured to transmit an instruction to a network entity to transmit the configuration information with a group indication, identifying the plurality of first positioning assistance messages, in each of the plurality of first positioning assistance messages.

46. The location server of clause 41, wherein the processor is configured to transmit the configuration information with a group indication, identifying the plurality of first positioning assistance messages, separately from the plurality of first positioning assistance messages.

47. A location server comprising:
means for associating a first area of applicability with a plurality of first positioning assistance messages each including respective first positioning assistance data;
means for associating a second area of applicability with a second positioning assistance message that is distinct from the plurality of first positioning assistance messages and that includes second positioning assistance data; and
means for transmitting configuration information to a user equipment indicating that the first area of applicability is associated with the plurality of first positioning assistance messages and that the second area of applicability is associated with the second positioning assistance message.

48. The location server of clause 47, wherein the plurality of first positioning assistance messages comprises a single positioning assistance message corresponding to multiple frequency layers.

49. The location server of clause 47, wherein the plurality of first positioning assistance messages comprises multiple positioning assistance messages each corresponding to multiple frequency layers.

50. The location server of clause 47, wherein the plurality of first positioning assistance messages comprises multiple positioning assistance messages each corresponding to a single frequency layer.

51. The location server of clause 47, further comprising means for causing a network entity to transmit the configuration information with a group indication, identifying the plurality of first positioning assistance messages, in each of the plurality of first positioning assistance messages.

52. The location server of clause 47, wherein the means for transmitting the configuration information comprise means for transmitting the configuration information with a group indication, identifying the plurality of first positioning assistance messages, separately from the plurality of first positioning assistance messages.

53. A configuration method comprising:
associating a first area of applicability with a plurality of first positioning assistance messages each including respective first positioning assistance data;
associating a second area of applicability with a second positioning assistance message that is distinct from the plurality of first positioning assistance messages and that includes second positioning assistance data; and
transmitting configuration information to a user equipment indicating that the first area of applicability is associated with the plurality of first positioning assistance messages and that the second area of applicability is associated with the second positioning assistance message.

54. The method of clause 53, wherein the plurality of first positioning assistance messages comprises a single positioning assistance message corresponding to multiple frequency layers.

55. The method of clause 53, wherein the plurality of first positioning assistance messages comprises multiple positioning assistance messages each corresponding to multiple frequency layers.

56. The method of clause 53, wherein the plurality of first positioning assistance messages comprises multiple positioning assistance messages each corresponding to a single frequency layer.

57. The method of clause 53, further comprising causing a network entity to transmit the configuration information with a group indication, identifying the plurality of first positioning assistance messages, in each of the plurality of first positioning assistance messages.

58. The method of clause 53, wherein transmitting the configuration information comprises transmitting the configuration information with a group indication, identifying the plurality of first positioning assistance messages, separately from the plurality of first positioning assistance messages.

59. A non-transitory, processor-readable storage medium comprising processor-readable instructions configured to cause a processor of a location server to:
associate a first area of applicability with a plurality of first positioning assistance messages each including respective first positioning assistance data;
associate a second area of applicability with a second positioning assistance message that is distinct from the plurality of first positioning assistance messages and that includes second positioning assistance data; and
transmit configuration information to a user equipment indicating that the first area of applicability is associated with the plurality of first positioning assistance messages and that the second area of applicability is associated with the second positioning assistance message.

60. The storage medium of clause 59, wherein the plurality of first positioning assistance messages comprises a single positioning assistance message corresponding to multiple frequency layers.

61. The storage medium of clause 59, wherein the plurality of first positioning assistance messages comprises multiple positioning assistance messages each corresponding to multiple frequency layers.

62. The storage medium of clause 59, wherein the plurality of first positioning assistance messages comprises multiple positioning assistance messages each corresponding to a single frequency layer.

63. The storage medium of clause 59, further comprising processor-readable instructions configured to cause the processor to transmit an instruction to a network entity to transmit the configuration information with a group indication, identifying the plurality of first positioning assistance messages, in each of the plurality of first positioning assistance messages.

64. The storage medium of clause 59, wherein the processor-readable instructions configured to cause the processor to transmit the configuration information comprise processor-readable instructions configured to cause the processor to transmit the configuration information with a group indication, identifying the plurality of first positioning assistance messages, separately from the plurality of first positioning assistance messages.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. A statement that a feature implements, or a statement that a feature may implement, a function includes that the feature may be configured to implement the function (e.g., a statement that an item performs, or a statement that the item may perform, function X includes that the item may be configured to perform function X). Elements discussed may be components of a larger system, wherein other rules may take precedence over or otherwise modify the application of the invention. Also, a number of operations may be undertaken before, during, or after above-discussed elements or operations are considered. Accordingly, the above description does not bound the scope of the claims.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Components, functional or otherwise, shown in the figures and/or discussed herein as being connected or communicating with each other are communicatively coupled unless otherwise noted. That is, they may be directly or indirectly connected to enable communication between them.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

As used herein, unless otherwise stated, a statement that a function or operation is "based on" an item or condition means that the function or operation is based on the stated item or condition and may be based on one or more items and/or conditions in addition to the stated item or condition.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment comprising:
a transceiver;
a memory; and
a processor, communicatively coupled to the transceiver and the memory, and configured to:
  receive, via the transceiver, first positioning assistance data having a first area of applicability and a first positioning assistance data profile;
  store the first positioning assistance data in the memory;
  determine that second positioning assistance data correspond to the first positioning assistance data based on the first area of applicability including a second area of applicability, of the second positioning assistance data, and based on a second positioning assistance data profile of the second positioning assistance data corresponding to the first positioning assistance data profile; and
  measure a positioning signal corresponding to the second area of applicability using the first positioning assistance data in response to determining that the second positioning assistance data correspond to the first positioning assistance data.

2. The user equipment of claim 1, wherein to measure the positioning signal the processor is configured to measure the positioning signal based on the first positioning assistance data, without reading the second positioning assistance data from a positioning assistance message, in response to determining that the second positioning assistance data correspond to the first positioning assistance data.

3. The user equipment of claim 1, wherein the processor is configured to:
receive, from a network entity via the transceiver, an indication of a positioning assistance data area of applicability for each of a plurality of positioning assistance data groups; and
determine the second area of applicability to be the positioning assistance data area of applicability corresponding to a particular positioning assistance data group, of the plurality of positioning assistance data groups, that comprises an indication of the second positioning assistance data.

4. The user equipment of claim 1, wherein the second positioning assistance data profile comprises an indicated frequency layer, and wherein the processor is configured to:
receive, from a network entity via the transceiver, a plurality of indications indicating positioning assistance data areas of applicability and associated frequency layers including a particular positioning assistance data area of applicability with a particular associated frequency layer that comprises the indicated frequency layer; and
determine the second area of applicability to be the particular positioning assistance data area of applicability based on the particular associated frequency layer comprising the indicated frequency layer.

5. The user equipment of claim 4, wherein the plurality of indications further indicate positioning assistance data groups associated with the positioning assistance data areas of applicability, the particular positioning assistance data area of applicability being associated with a particular positioning assistance data group of the positioning assistance data groups, and wherein the processor is configured to determine the second area of applicability to be the particular positioning assistance data area of applicability based further on the particular positioning assistance data group comprising an indication of the second positioning assistance data.

6. The user equipment of claim 1, wherein the processor is configured to read the second positioning assistance data from a positioning assistance message, and measure the positioning signal using the second positioning assistance data, in response to determining that the second positioning assistance data are different from the first positioning assistance data.

7. The user equipment of claim 1, wherein the processor is configured to determine the second positioning assistance data based on a positioning method.

8. The user equipment of claim 1, wherein the processor is configured to determine whether the first positioning assistance data have expired.

9. The user equipment of claim 1, wherein the processor is configured to obtain the second area of applicability from a positioning assistance message containing the second positioning assistance data.

10. The user equipment of claim 1, wherein the processor is configured to use a present serving cell of the user equipment as the second area of applicability.

11. A signal measuring method comprising:
receiving, at a user equipment, first positioning assistance data having a first area of applicability and a first positioning assistance data profile;
storing the first positioning assistance data at the user equipment;
determining, at the user equipment, that second positioning assistance data correspond to the first positioning assistance data based on the first area of applicability including a second area of applicability, of the second positioning assistance data, and based on a second positioning assistance data profile of the second positioning assistance data corresponding to the first positioning assistance data profile; and
measuring, at the user equipment, a positioning signal corresponding to the second area of applicability using the first positioning assistance data in response to determining that the second positioning assistance data correspond to the first positioning assistance data.

12. The method of claim 11, wherein measuring the positioning signal comprises measuring the positioning signal based on the first positioning assistance data, without reading the second positioning assistance data from a positioning assistance message, in response to determining that the second positioning assistance data correspond to the first positioning assistance data.

13. The method of claim 11, further comprising:
receiving, at the user equipment from a network entity, an indication of a positioning assistance data area of applicability for each of a plurality of positioning assistance data groups; and
determining, at the user equipment, the second area of applicability to be the positioning assistance data area of applicability corresponding to a particular positioning assistance data group, of the plurality of positioning assistance data groups, that comprises an indication of the second positioning assistance data.

14. The method of claim 11, wherein the second positioning assistance data profile comprises an indicated frequency layer, and wherein the method further comprises:
receiving, at the user equipment from a network entity, a plurality of indications indicating positioning assistance data areas of applicability and associated frequency layers including a particular positioning assistance data area of applicability with a particular associated frequency layer that comprises the indicated frequency layer; and
determining, at the user equipment, the second area of applicability to be the particular positioning assistance data area of applicability based on the particular associated frequency layer comprising the indicated frequency layer.

15. The method of claim 14, wherein the plurality of indications further indicate positioning assistance data groups associated with the positioning assistance data areas of applicability, the particular positioning assistance data area of applicability being associated with a particular positioning assistance data group of the positioning assistance data groups, and wherein the second area of applicability is determined to be the particular positioning assistance data area of applicability based further on the particular positioning assistance data group comprising an indication of the second positioning assistance data.

16. The method of claim 11, further comprising reading, at the user equipment, the second positioning assistance data from a positioning assistance message, and measuring, at the user equipment, the positioning signal using the second positioning assistance data, in response to determining that the second positioning assistance data are different from the first positioning assistance data.

17. The method of claim 11, further comprising determining the second positioning assistance data based on a positioning method.

18. The method of claim 11, further comprising determining whether the first positioning assistance data have expired.

19. The method of claim 11, further comprising obtaining the second area of applicability from a positioning assistance message containing the second positioning assistance data.

20. The method of claim 11, further comprising using a present serving cell of the user equipment as the second area of applicability.

* * * * *